UNITED STATES PATENT OFFICE.

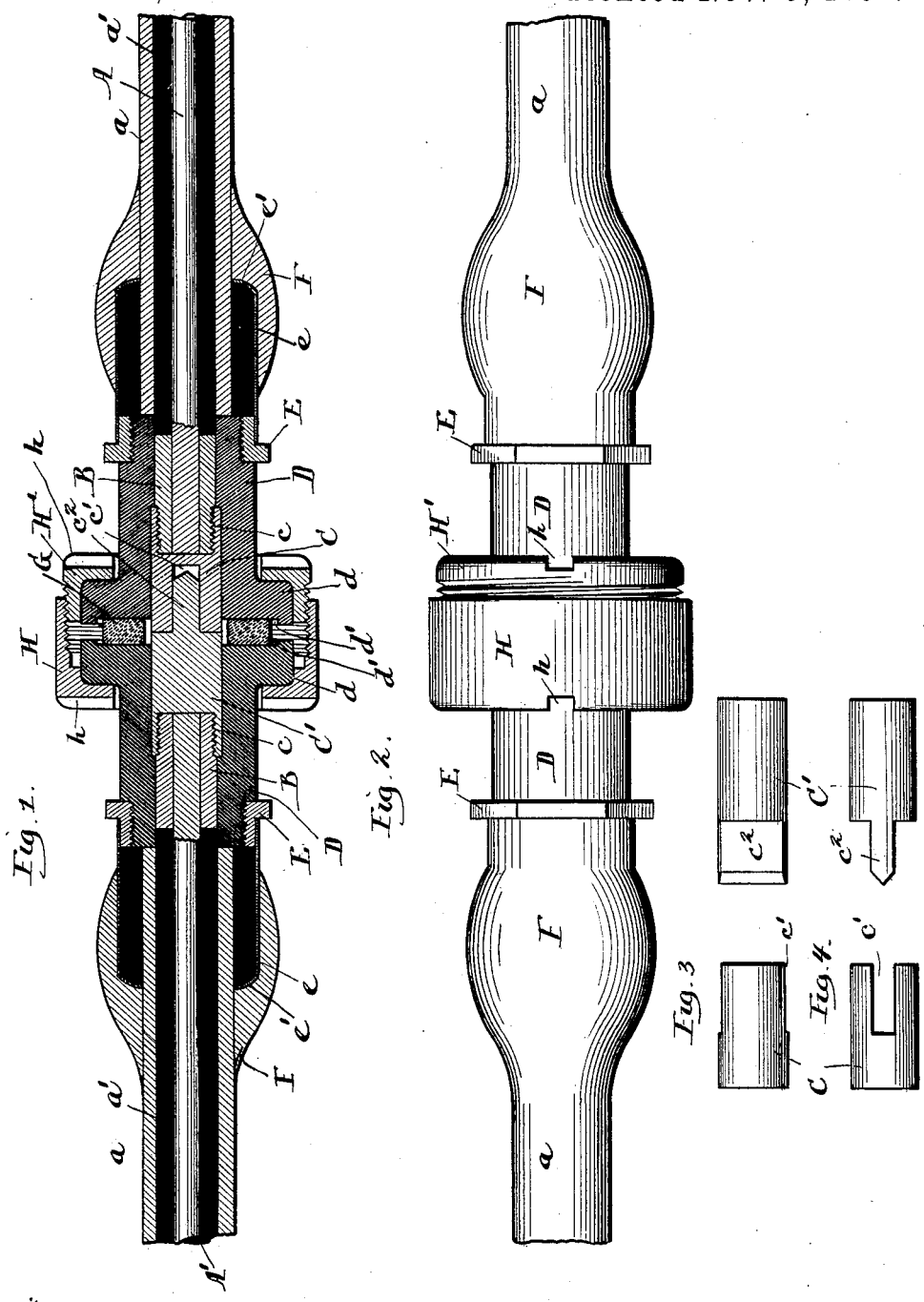

GEORGE TAILLEUR, OF CHICAGO, ILLINOIS, ASSIGNOR TO THE CHICAGO EDISON COMPANY, OF SAME PLACE.

JOINT OR COUPLING FOR ELECTRIC CABLES.

SPECIFICATION forming part of Letters Patent No. 593,442, dated November 9, 1897.

Application filed July 31, 1897. Serial No. 646,687. (No model.)

*To all whom it may concern:*

Be it known that I, GEORGE TAILLEUR, a resident of the city of Chicago, in the county of Cook and State of Illinois, have invented certain new and useful Improvements in Joints or Couplings for Electric Cables, of which I do declare the following to be a full, clear, and exact description, reference being had to the accompanying drawings, forming a part of this specification.

The present invention has for its object to provide a simple and effective means whereby the terminals of electric cables or wires, particularly such as are designed for carrying currents of high tension, may be joined together in such manner that the access of moisture to the cable-terminals will be securely guarded against.

The invention, while applicable for use in a variety of situations, is more especially designed for connecting sections of cables in underground systems, as at the junction-boxes of underground conduits, where it is of the utmost importance that there shall be provided for the cable-terminals a moisture-proof joint or coupling whereby the cable-terminals can be quickly connected and disconnected.

The invention consists in the feature of improvement hereinafter described, illustrated in the accompanying drawings, and particularly pointed out in the claims at the end of this specification.

Figure 1 is a view in central longitudinal section through the adjacent ends of two cable-sections or conductor-wires and the joint or coupling whereby these sections are united. Fig. 2 is a view in elevation of the part shown in Fig. 1. Fig. 3 is a detail side view of the terminals for the ends of the conductor sections or cables, these terminals being separated. Fig. 4 is a plan view of the parts as shown in Fig. 3.

A and A' designate the electric cables or conductors, which in the present instance are shown as inclosed within the usual lead pipe $a$, suitable insulating material $a'$ being interposed between the conductor or cable sections A A' and the covering-pipe $a$. The end of each of the conductors A A' is laid bare and has fixed thereto a bushing B, the end of which bushing is exteriorly threaded to engage the interiorly-threaded socket $c$ of its terminal. The terminals C and C' have their ends arranged to interlock, the terminal C being preferably formed with a transverse groove $c'$, while the terminal C' is formed with a tongue $c^2$, adapted to enter said groove, as clearly seen in Figs. 1, 3, and 4 of the drawings. The bushing B and terminal of each conductor or cable is inclosed within a sleeve D, preferably of hard rubber or like insulating material, this sleeve D being provided with a bore of proper size to receive the bushing and terminal. The inner end of each of the sleeves D D is formed with an exterior thread to engage the correspondingly-threaded metal collar E, that is provided with a thin cylindric extension $e$, preferably formed from thin metal tubing soldered or brazed to the collar E. The inner end of the tubing $e$ is preferably bent downward, as at $e'$, and the space between the tubing $e$ and the lead covering $a$ of the cable or conductor is filled with tape or like material. The tubing $e$ is connected to the covering $a$ of the cable or conductor by a wipe-joint F. The outer end of each of the sleeves D is formed with a flange $d$, and the ends of the sleeves D are preferably slightly recessed, as at $d'$, to receive a soft-rubber gasket G, that will be placed between the opposing ends of the sleeves when they are to be joined together.

A two-part coupling serves to firmly draw and hold the terminals and their inclosing sleeves together, this coupling consisting, preferably, of the sections H and H', the section H being revolubly mounted upon one of the sleeves D, while the section H' of the coupling is mounted upon the sleeve inclosing the other conductor-terminal. The coupling-section H' is exteriorly threaded to enter and engage with the interiorly-threaded part of the coupling H. Preferably each of the coupling-sections H and H' is provided with notches $h$, adapted to receive a spanner-wrench, whereby the sections can be conveniently turned.

From the foregoing description it will be seen that when the parts are to be put together the bushings B will first be secured to the ends of the conductors A, after which the sleeves D, with their corresponding coupling-sections H H' thereon, will be placed in position, with the collars E and tubing e on the end of each sleeve D. The ends of the tubing will then be bent downward, as at e', and by the wipe-joints F the tubes will be connected to the lead cover a of the conductor. The conductor-terminals C C' will then be secured onto the bushings B and the terminals will be in readiness to be joined together. The rubber gasket G will then be placed between the opposing ends of the sleeves D, and by screwing together the coupling-sections H H' the sleeves will be drawn tightly together and the terminals C and C' will be held in firm contact.

My improved joint or coupling affords a most effective means whereby cables or high-tension wires can be quickly connected and disconnected, and when in use the cables or wires are perfectly guarded against all possibility of access of moisture thereto. By inclosing the terminals C C' within the sleeves D and thus avoiding any space around the terminals no trouble can be experienced from condensation upon the terminals or from the accumulation of the moisture within the coupling, and by this arrangement also a greater strength is given to the joint and the danger of any mechanical contact between the terminals and the sections H H' is avoided. The sleeves D being of insulating material or properly insulated enable the connection and disconnection of the terminals to be effected without danger to the workman.

While I have shown what I regard as the preferred form of the invention, I do not wish the invention to be understood as restricted to the details above set out, since manifestly these may be varied by the skilled mechanic.

Having thus described my invention, what I claim as new, and desire to secure by Letters Patent, is—

1. The combination with conductor or cable ends, of interlocking terminals, insulating-sleeves connected to said conductors and having opposing flanged ends and a two-part coupling engaging the flanged ends of said sleeves and serving to hold the terminals and the sleeves together.

2. The combination with the conductor or cable ends, of interlocking terminals, sleeves inclosing said terminals, a gasket or packing interposed between the ends of the sleeves and a two-part coupling engaging the ends of the sleeves and serving to draw them firmly against said gasket or packing.

3. The combination with the conductor or cable ends, of interlocking terminals, insulating-sleeves covering said terminals and extending approximately to the ends thereof and a revoluble two-part threaded coupling mounted upon said sleeves and serving to hold the ends of said sleeves together.

4. The combination with the conductor or cable ends, of interlocking terminals, insulating-sleeves having bores within which said terminals fit and a coupling for uniting said sleeves comprising interiorly and exteriorly threaded cylindrical parts adapted to be secured together.

5. The combination with the conductor or cable ends and with their terminals, of the insulating-sleeves flanged at their outer ends and each provided with one section of a two-part coupling and screw-threaded at their inner ends, a metallic threaded collar engaging the inner ends of the insulating-sleeves and joined to the covering of the conductors or cables.

6. The combination with the conductor or cable ends and with their terminals, of the insulating-sleeves flanged at their outer ends and each provided with one section of a two-part coupling and screw-threaded at their inner ends, a metallic threaded collar engaging the inner ends of the insulating-sleeves and provided with a tubular extension, said extension being connected by a wipe-joint with the covering of a corresponding conductor or cable.

GEORGE TAILLEUR.

Witnesses:
GEORGE P. FISHER, Jr.,
ALBERTA ADAMICK.